US006975820B2

(12) United States Patent
Wong (10) Patent No.: US 6,975,820 B2
(45) Date of Patent: Dec. 13, 2005

(54) DEVICE CONTROL USING JOB TICKET SCORING

(75) Inventor: Peter W. Wong, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 100 days.

(21) Appl. No.: 10/779,515

(22) Filed: Feb. 13, 2004

(65) Prior Publication Data

US 2005/0180770 A1    Aug. 18, 2005

(51) Int. Cl.[7] ............................................. G03G 15/00
(52) U.S. Cl. ......................................... 399/82; 399/83
(58) Field of Search ............................. 399/75, 76, 77, 399/81, 82, 83, 85, 87; 358/1.15, 1.16, 1.17; 347/129

(56) References Cited

U.S. PATENT DOCUMENTS

| | | | |
|---|---|---|---|
| 5,305,056 A * | 4/1994 | Salgado et al. ................ | 399/11 |
| 5,790,119 A * | 8/1998 | Sklut et al. ................... | 715/839 |
| 6,239,880 B1 * | 5/2001 | Barrett et al. ............... | 358/1.16 |
| 6,581,097 B1 * | 6/2003 | Lynch et al. ................. | 709/226 |

OTHER PUBLICATIONS

F.D. Wright. *Requirements and Design Goals for an Internet Printing Protocol*. StandardView vol. 6, No. 4, Dec. 1998, pp. 172-179.

M. Flynn, D. Pendlebury, C. Jones, M. Eldridge and M. Lamming. *The Satchel System Architecture: Mobile Access to Documents and Services*. Baltzer Science Publishers BV. 2000, pp. 243-258.

* cited by examiner

*Primary Examiner*—Hoang Ngo
(74) *Attorney, Agent, or Firm*—Watts Hoffmann Co, LPA (57) ABSTRACT

A method for controlling a device capable of performing an operation in response to a job ticket includes comparing the job ticket with options within the capabilities of the device for fulfilling the job. One such device is a printer coupled to a computer for printing text and the like in accordance with such a job ticket. The job configuration and the options defining the plurality of operations preferably are stored in data structures, most preferably XML files validated under an XML schema defining options for a universe of similar operations. Each comparison of the job configuration with a device capability option results in a score. These scores are compared to obtain an optimal or preferred option which best approximates the job ticket within the capabilities of the device.

38 Claims, 7 Drawing Sheets

DEVICE CONTROL USING JOB TICKET SCORING

FIELD OF THE INVENTION

The present invention concerns the control of devices such as electronic printers capable of performing operations fulfilled by device capabilities options.

BACKGROUND ART

Numerous electronic devices are capable of performing operations fulfilled by options selected by a user. For example, some conventional clothes dryers are configured to allow users to choose from pre-defined drying cycles designed for popular fabric types such as cotton, wool or silk. The choice of cycle controls the time, temperature and degree of agitation used in drying the fabric. If a user wishes to dry a fabric which is not among the particular types for which pre-defined cycles have been provided, the user must choose among those cycles the combination of time, temperature and degree of agitation which best approximates the ideal for the fabric which the user wishes to dry.

This observation is true for many peripheral devices for data processing systems and the like. Conventional electronic printers are designed to allow users to print documents in a variety of formats, such as in different paper sizes, color schemes and fonts. Conventional scanners allow users to vary the operations which the scanners perform by selecting different scan areas, pixel densities and output formats. Typically, a peripheral device is controlled by a combination of software found in an operating system resident in the data processing system, such as one of the WIDOWS brand operating systems available from Microsoft Corporation of Redmond, Wash., and in "driver" software typically sold with the device itself. Some application packages also include driver software.

Various manufacturers supply devices which perform similar operations but have different capabilities. Devices of the same model may have different capabilities depending on the manner in which their users configure them. For example, users may load particular types of paper into the paper trays of an electronic printer. If a user's preferred paper type is not among those loaded into the paper trays, the user must choose among those paper types available the combination of properties which best approximates those the user desires.

One type of prior art software which controls print jobs by electronic printers includes a data structure having specific fields for entering desired print options. Descriptions of additional capabilities of the device are reduced to indices, that is, to pages organized and tabulated to facilitate search.

Job tickets are used to specify the print options to be used in printing the content of computer files. When a text or image file having a job ticket prepared for one printer is transferred electronically to a recipient, the software controlling the recipient's printer must select the print option available on the recipient's printer which best approximates the print configuration requested in the job ticket. Typically, any combination of desired properties in the job ticket which is not among the options recognized by the software controlling the recipient's printer is reset in whole or in part to default values. Indices are honored only if the model and driver version are identical. As a result, the document printed by the recipient may differ significantly from that printed from the same text or data file by the creator.

The data structures used in conventional printer control software lack interoperability. That is, such software typically defines options in terms of a single naming convention. Such data structures are not easily adapted to serve users defining similar options using different nomenclature.

SUMMARY OF THE INVENTION

A method and a system are disclosed for controlling devices such as electronic printers capable of performing an operation in response to a job ticket, the operation being fulfilled by device capabilities options. A preferred method and system distinguishes between two types of settings, "parameters" and "features." "Parameters" are settings having values which do not need to be explicitly enumerated. Typically, parameters have large numbers of possible values. An example of a parameter for an electronic printer is a copy count, which may range from 1 to a large number such as 9999 for certain printers.

Each Feature contains one or more Options. Each Option contains one or more properties which describe what is offered when that Option is selected. For each Feature, a user may select one or more Options according to his preference. A user will not be permitted to select the individual properties contained within the various Options; instead, the user may only select among the prepackaged combinations of properties offered by each Option.

A preferred method for controlling the device includes comparing the Option(s) requested by a job ticket for a given Feature with the available Options offered by the device for the corresponding Feature. Each available Option offered by the device is compared to the Option requested by the job ticket and assigned a score depending on how closely they match. The Option that most closely matches the intent specified by the job ticket is the one with the highest score.

Most preferably, the device capabilities options can be represented by trees of scored properties and the job ticket specified options can be represented by a tree of desired properties. Each vertex or node on the tree represents an aspect of the operation performed by the device when that particular Option is selected. The preferred method is recursive: scored properties on leaf vertices of the trees of scored properties are compared with corresponding properties of the tree of desired properties first. These comparisons yield scoring factors which are accumulated to obtain scoring factors for the next higher levels of the tree. This process is continued until a final scoring factor for each device capabilities option is obtained. In accordance with an exemplary embodiment, the scoring algorithm used for this comparison and accumulation is the same at each of the levels of the trees.

The preferred system and method are improvements over prior art techniques. The exemplary method selects the optimal operation by adopting the option closest to the job ticket intent rather than adopting default values in the absence of an exact match.

These and other objects, advantages and features will become better understood from the accompanying exemplary embodiment which is described in conjunction with the accompanying drawings.

EXEMPLARY SYSTEM FOR PRACTICING THE INVENTION

Figure 1:
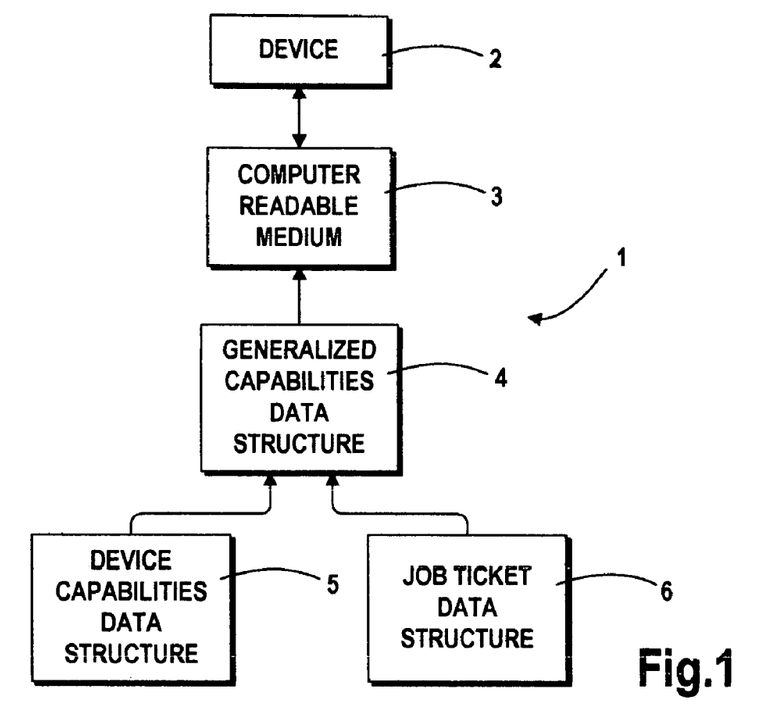
FIG. 1 is a schematic representation of an exemplary method for controlling a device.
Figure 2:
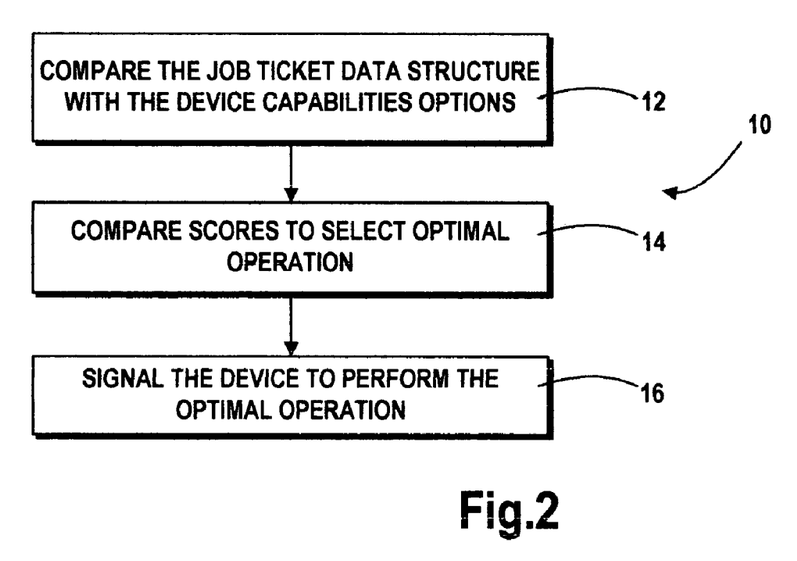
FIG. 2 is a schematic representation of an exemplary method for controlling a print job.

FIG. 1 depicts a representative system 1 for controlling a device 2 such as an electronic printer or scanner. The system 1 comprises a computer readable medium 3 including a generalized capabilities data structure 4 and a device capabilities data structure 5. FIG. 2 depicts a representative method 10 for controlling the device 2. The method 10 compares 12 an intended operation specified in a job ticket data structure 6 with options within the capabilities of the device 2. These device capabilities options are stored in the data structure 5. Each comparison of the job ticket with a device capabilities option produces a score. These scores are compared 14 to select an optimal operation within the capabilities of the device 2. Once the optimal operation is selected, the device 2 is signaled 16 to perform that operation.

For ease and clarity of exposition only, the exemplary system and method will be described in terms of controlling the operation of an electronic printer in communication with a data processing system unless otherwise noted. Those skilled in the art will recognize that the invention is not limited thereto. The preferred system and method are not limited to peripheral devices for data processing systems but can include other electronic equipment. The preferred system and method can be used to control any device, or combination of devices, capable of receiving and processing job configurations electronically.

Computer System

Figure 3:
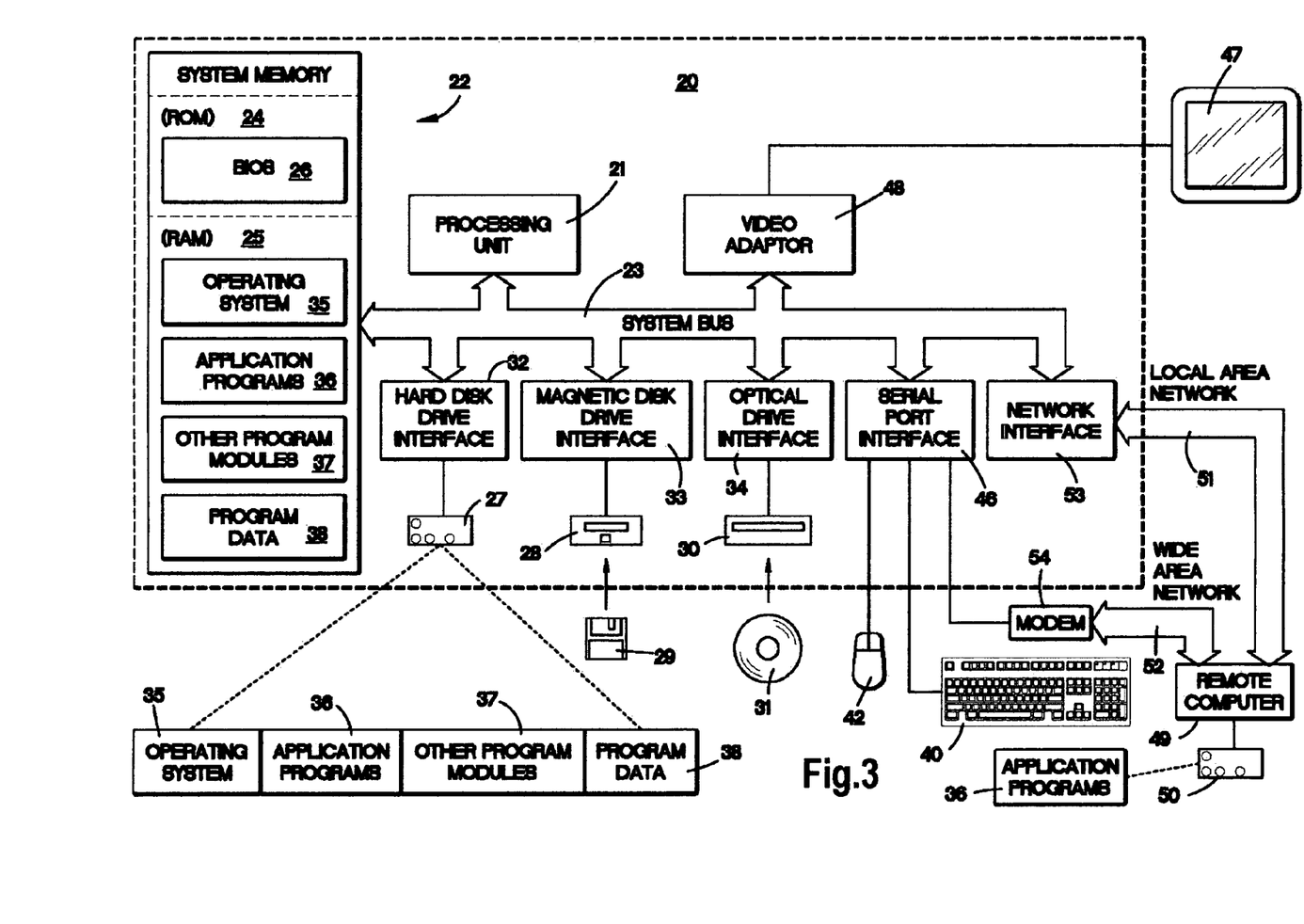
FIG. 3 is a representative computer system used in implementing components of an exemplary embodiment of the present invention.

FIG. 3 depicts an exemplary data processing system. The system includes a general purpose computing device in the form of a conventional computer 20, including one or more processing units 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures.

The system memory 22 includes read only memory (ROM) 24 and random access memory (RAM) 25. A basic input/output system 26 (BIOS), containing the basic routines that help to transfer information between elements within the computer 20, such as during start-up, is stored in ROM 24.

The computer 20 further includes a hard disk drive 27 for reading from or writing to a hard disk, not shown; a magnetic disk drive 28 for reading from or writing to a removable magnetic disk 29; and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers (PCs) typically include other peripheral output devices (not shown), such as speakers and printers.

The computer 20 may operate in a networked environment using logical connections to one or more remote computers, such as a remote computer 49. The remote computer 49 may be another PC, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 and other means for establishing communications over the WAN 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Data Structures

Referring to FIG. 1, a preferred generalized capabilities data structure 4 is an XML schema. Preferred device capabilities data structures 5 and job ticket data structures 6 are XML files including references to the generalized capabilities data structure 4. The preferred generalized capabilities data structure 4 includes a tree of generalized properties. The preferred device capabilities data structure 5 includes a complete set of Features representing the device capabilities or functionalities provided by the device, each Feature typically containing multiple Options, each Option representing a state or setting that can be selected for that particular Feature, each Option containing a tree of scored properties, each scored property describes an aspect of that Option. The preferred job ticket data structure 6 includes a set of Features, each Feature typically containing one Option, each Option containing a tree of desired properties. Typically a job ticket is constructed by taking a particular device's Device capabilities data structure, and pruning out the unwanted Options under each Feature, leaving only the desired Option for each Feature. The trees of scored properties and the tree of desired properties preferably are expressed in XML validated under the generalized capabilities data structure 4. Validation of the device capabilities data structure 5 and the job ticket data structure 6 are routine procedures within the ordinary skill in the art. The generalized capabilities data structure 4 and the device capabilities data structure 5 may be stored in computer readable memory either in the device 2 itself or in a data processing system in communication with the device.

Scoring Algorithm

Figure 4A:
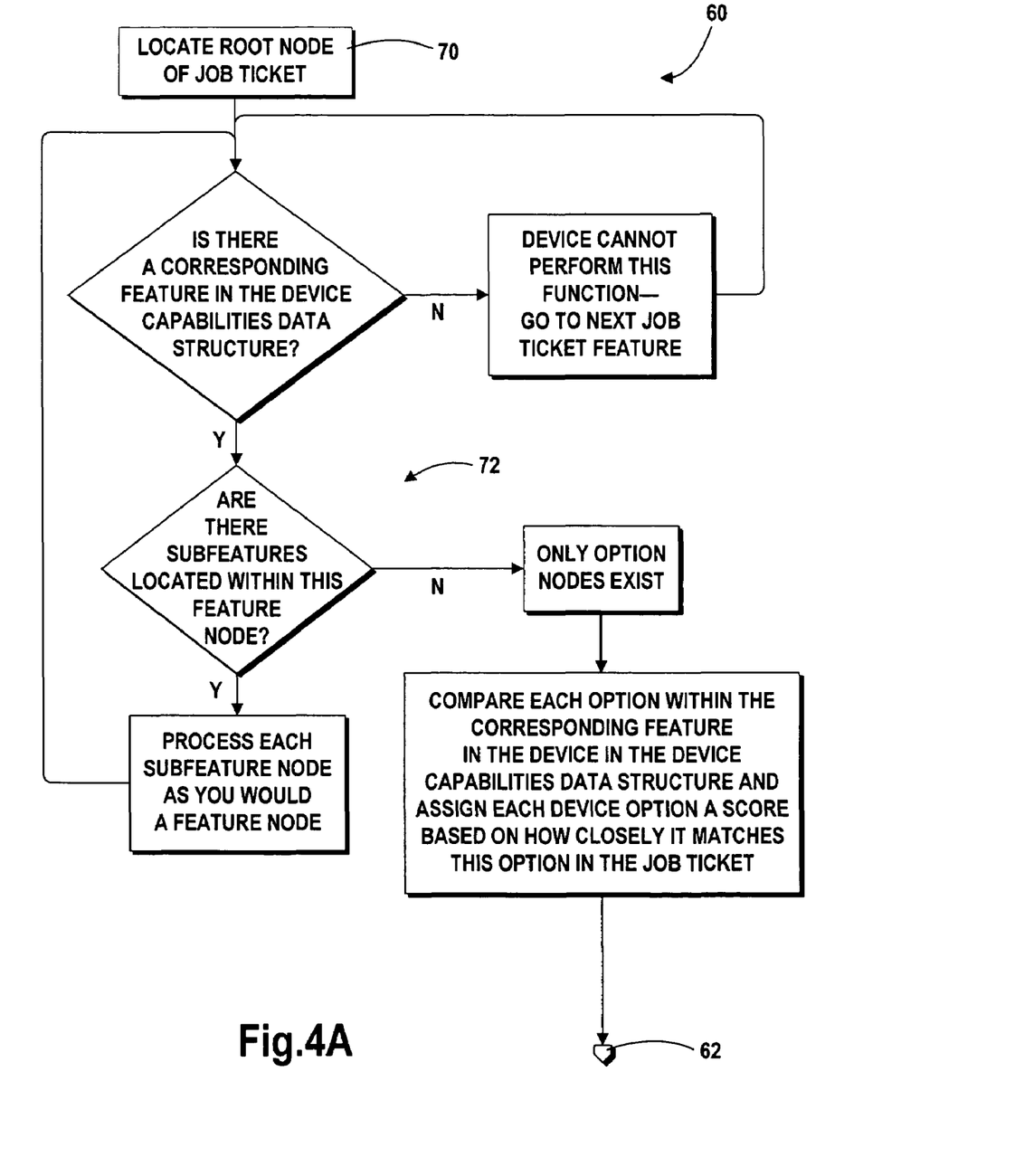
FIGS. 4A, 4B and 4C are a schematic representation of an exemplary scoring algorithm for use in controlling a print job.
Figure 4B:
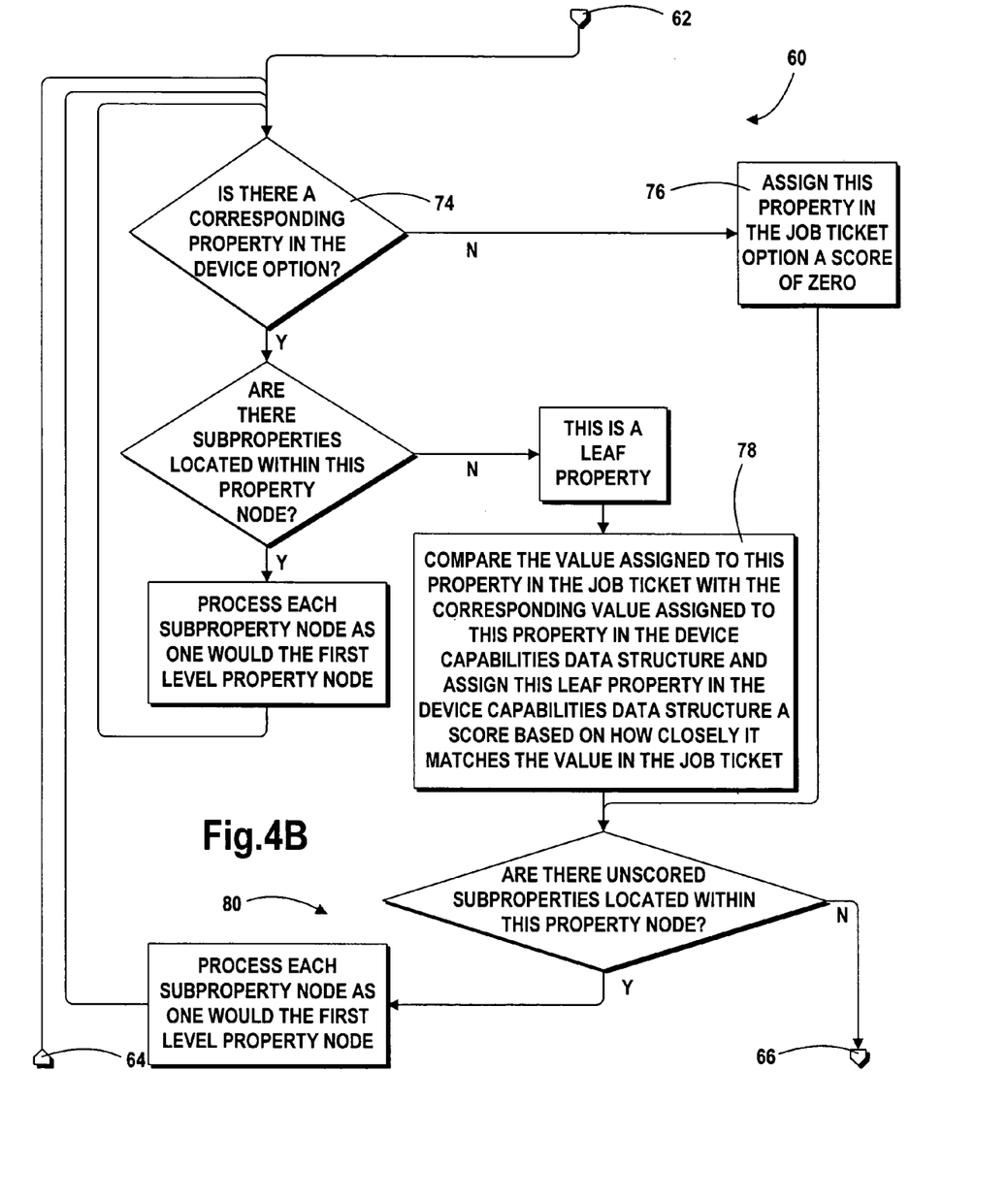
Figure 4C:
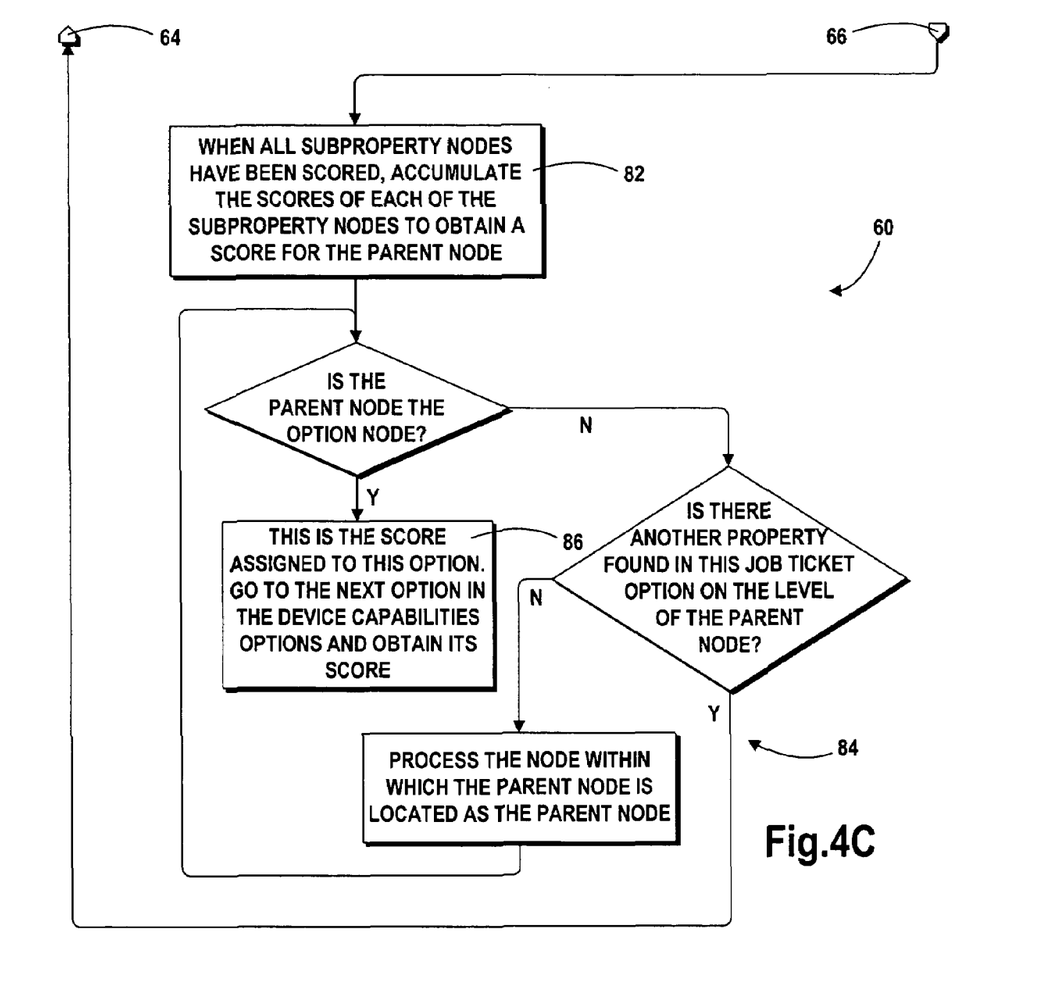

FIGS. 4A, 4B, and 4C depict an exemplary method or process 60 for determining an operation score for a device capabilities option. (The flowcharts reproduced in FIGS. 4A, 4B and 4C are joined at nodes 62, 64 and 66.) The job configuration represented by the job ticket data structure (6 in FIG. 1) is compared to each device capabilities option in turn, producing a final score associated with each such option.

The exemplary method 60 is recursive. The method 60 first locates a root node of the tree of scored properties corresponding to the device capabilities option under consideration. The method proceeds 72 to move in a top down, left to right manner through the tree of desired properties to find the lowest-level leaf vertex subordinate to that top-level vertex. The method then determines 74 whether the scored property positioned at that leaf vertex has a corresponding property in a corresponding vertex within the tree of desired properties found in the job ticket. If not, the scoring factor associated with that scored property is set 76 to zero. If the scored property has a corresponding property in the tree of desired properties, the scored property is compared 78 to the corresponding property to obtain a scoring factor for that scored property.

This process is repeated 80 for each scored property on the same level of the tree of scored properties. When scoring factors have been obtained for each property on the same level, the factors are accumulated 82 to obtain a scoring factor for a parent scored property, that is, for the vertex on the next higher level to which the scored properties whose scores were accumulated are subordinate in the tree of scored properties. The method then moves 84 to the level of the parent property and continues the process of obtaining scoring factors. When scoring factors have been obtained for each top-level vertex of the tree of scored properties, the scoring factors associated with the top-level vertices are accumulated 86 to obtain a final score for the a particular option. The method is then repeated for other options.

The technique by which one compares 78 the desired properties with the properties of the device capabilities option is not critical to the invention. One exemplary technique is binary: one assigns the value one to the scoring factor associated with a scored property if the scored property is substantially identical to the corresponding property of the tree of desired properties found in the job ticket. One assigns the value zero to the scoring factor if the scored factor is not substantially identical to the corresponding job ticket proprety.

In accordance with another exemplary technique, each desired property, or a subset of the desired properties, is assigned an ordinal number "i" and a numerical weight $W_i$. Corresponding properties of the trees of scored properties are assigned the same ordinal numbers. The numerical weights preferably are stored in the job ticket data structure (6 in FIG. 1). Where the job ticket fails to assign a numerical weight to a particular feature or property, a default weight can be assigned. When comparing the desired option with the equivalent device capabilities option, one assigns the value of the numerical weight $W_i$ to the scoring factor associated with the scored property "i" if the scored property "i" is substantially identical to the desired property "i" of the tree of desired properties. One assigns the value zero to the scoring factor if the scored factor "i" is not substantially identical to the desired factor "i".

In accordance with yet another exemplary technique, a variance function "$V_i[m_i]$" is assigned to each desired property or to a ubset of the desired properties. For this purpose, "$m_i$" is a measure between the desired property "i" and the scored properties "i." "$V_i$" is a non-negative, monotone decreasing function of "m" such that $V_i[0]=1$. (A measure is commonly defined as any function defined for any two elements "a" and "b" of a set such that m(a, b)=m(b, a); m(a, b)≧0; m(a, b)=0 if and only if a=b; and m(a, b)+m(b, c)≧m(a, c).). When comparing the desired option with the equivalent option of the array of device capabilities options, one assigns $V_i[m_i]$ to the scoring factor associated with the scored property "i." Alternatively, if a numerical weight $W_i$ is assigned, one may assign the product $W_i*V_i[m]$ to the scoring factor.

Where the options are quantifiable, an especially preferred variance function for use with the foregoing exemplary method is $V_i[\Delta]=k_i/[k_i+\Delta_i]$, where "$k_i$" is a variance factor assigned to the particular feature or property and "$\Delta_i$" is the absolute value of the difference between the desired property "i" and the scored property "i.". One example of a feature having quantifiable properties is paper size: where the paper sizes have the same width (e.g., letter and legal sizes), the differences in the lengths serves as measures of the differences between the options. The variance factors "$k_i$" preferably are stored in the job ticket (6 in FIG. 1). Where the job ticket fails to assign a variance factor, the method either assigns a default value to $k_i$ or reverts to assigning zero in the case of a mismatch and either the number one or a numerical weight "$W_i$" in the case of a match.

The assignment of numerical weights and variance functions to the desired properties increases the user's control over the selection of the operation to be performed in response to the job ticket. The assignment of numerical weights to the desired properties permits the user to identify which features and properties are most important in determining the optimal operation. Greater numerical weights indicate greater importance in determining which operation to perform. The variance function controls how fast the scoring factor decreases as a function of the mismatch between the scored property and the corresponding properties of the trees of scored properties. Increasing the variance factor "$k_i$" decreases the amount the scoring factor decreases as a function of mismatch. Thus, increasing the variance factor "$k_i$" decreases the importance of an exact match between the scored property and the corresponding property of the tree of desired properties while decreasing the range of properties which will contribute a non-zero, though reduced, scoring factor.

The method by which the scoring factors are accumulated is not critical to the present invention. Most preferably, the method includes performing a linear combination of the scoring factors. One exemplary method is simply to add the scoring factors contributed by the features or properties on the selected level to obtain the final score or a scoring factor for a parent property. Another exemplary method is to multiply the scoring factors $SF_i$ by numerical weights $W_i$ assigned to the desired properties to obtain a weighted sum $$\text{sum} \sum_i SF_i * W_i.$$

Another exemplary method is to add the scoring factors to obtain a weighted sum and then to divide the weighted sum by a normalizing factor. Where numerical weights $W_i$ are assigned to the desired properties, a preferred normalizing factor is obtained by adding all of the weights associated with the desired features or properties on the selected level, thereby obtaining a normalized sum:

$$\frac{\sum_i SF_i * W_i}{\sum_i W_i}$$

The latter method assures that the scoring factors of parent properties will not be unduly weighted in subsequent accumulation steps merely because those scoring factors were derived from adding the scoring factors of subproperties.

Conventional electronic printers are subject to constraints which prevent the printers from performing operations fulfilled by certain device capabilities options. Such a constraint may be handled by the preferred method or process in alternative ways. Constrained options may be excluded a priori from the scoring process. Alternatively, the operation scores or final scores obtained by the preferred method may be stored in memory. The device capabilities option having the most preferred score is checked first against the constraints on the device; then the option having the next most preferred score is checked against the constraints; and then the remaining combinations are checked in the same order as needed. Once a device capabilities option having the hightest score and which is not subject to any constraint, that option is used to perform the print operation.

Figure 5:
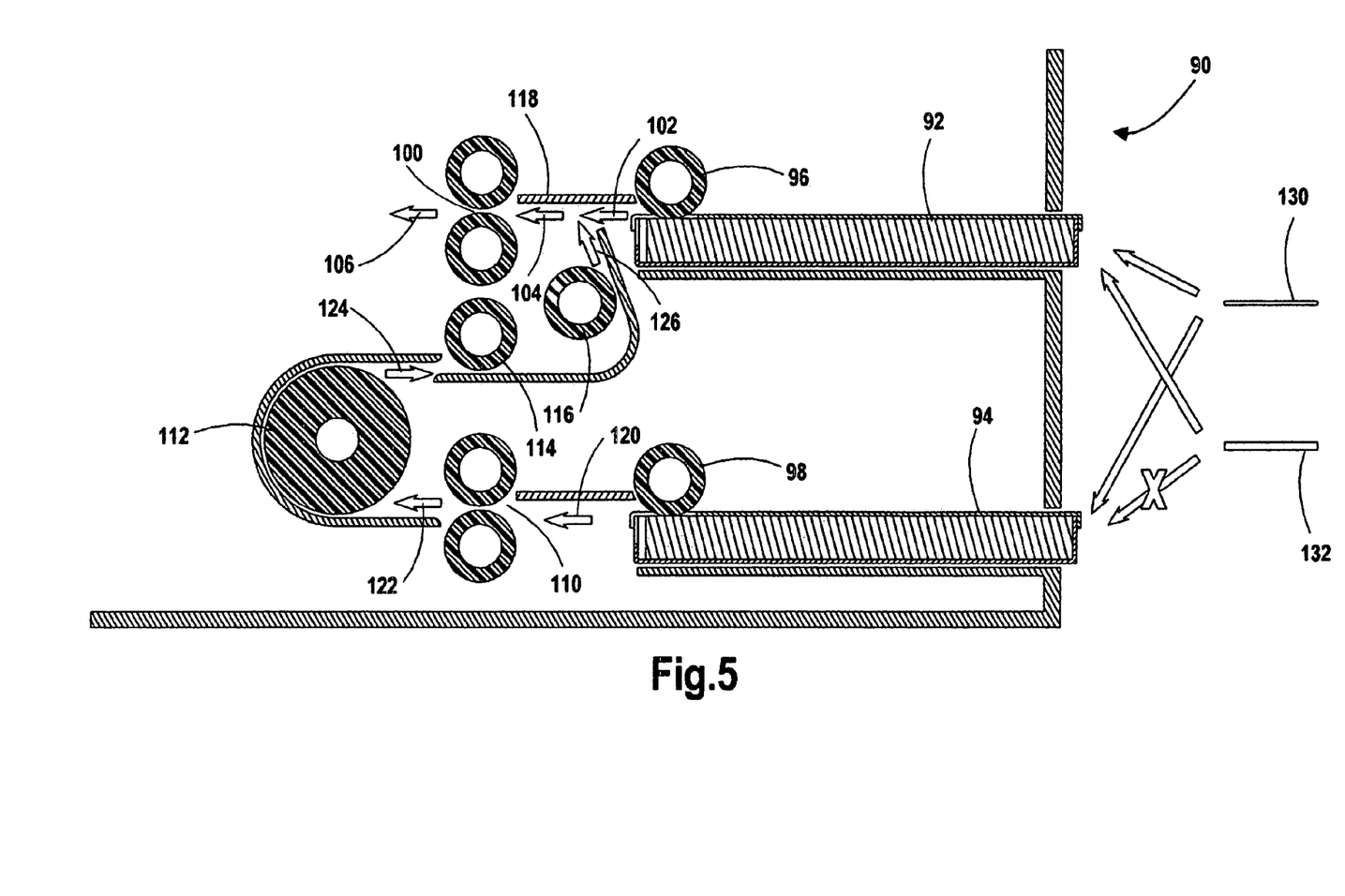
FIG. 5 is a simplified schematic of a printer used in illustrating a constraint on the device capabilities options.

One such constraint is illustrated in FIG. 5. A printer 90 depicted schematically in FIG. 5 includes an upper paper tray 92 and a lower paper tray 94. Rollers 96 and 98 pick sheets of paper from the paper trays 92, 94 for printing in response to job tickets. In the printer 90 depicted in FIG. 5, paper picked from the upper paper tray 92 follows a relatively straight path through a nip 100 toward the print head (not shown), as indicated by the arrows 102, 104 and 106. Paper picked from the lower paper tray 94 follows a more serpentine path: the paper passes through a nip 110; is bent over a roller 112; is bent again over rollers 114 and 116; and presses against a guide 118 to direct the paper into the nip 100, as indicated by the arrows 120, 122, 124, 126 and 104.

The manufacturer of the printer 90 may specify or preprogram a constraint which allows the printer to draw lightweight paper 130 from either the upper or lower paper tray 92, 94, but refuses a job ticket that draws heavier weight paper 132 from the lower paper tray 94. Since paper from the lower paper tray 94 follows a path 120, 122, 124, 126, 104, 106 toward the print head (not shown) which is more serpentine than the path 102, 104, 106 followed by paper from the upper paper tray 92, stiffer, heavier weight paper 132 is more likely to jam when picked from the lower paper tray 94 than when picked from the upper paper tray 92.

For example, if the only constraint on the printer 90 is that heavier weight paper 132 cannot be drawn from the lower paper tray 94, each device capabilities option for the printer 90 will be checked against the constraint in order according to the preference of the final score associated with each such option, from most preferred to least preferred. The device capabilities option which has the most preferred final score among those options which do not specify both the use of heavier weight paper 132 and the use of paper drawn from the lower paper tray 94 will have the highest score.

EXAMPLES

The following examples are illustrative only and are not intended to limit the scope or range of the invention.

Example 1

Figure 6:
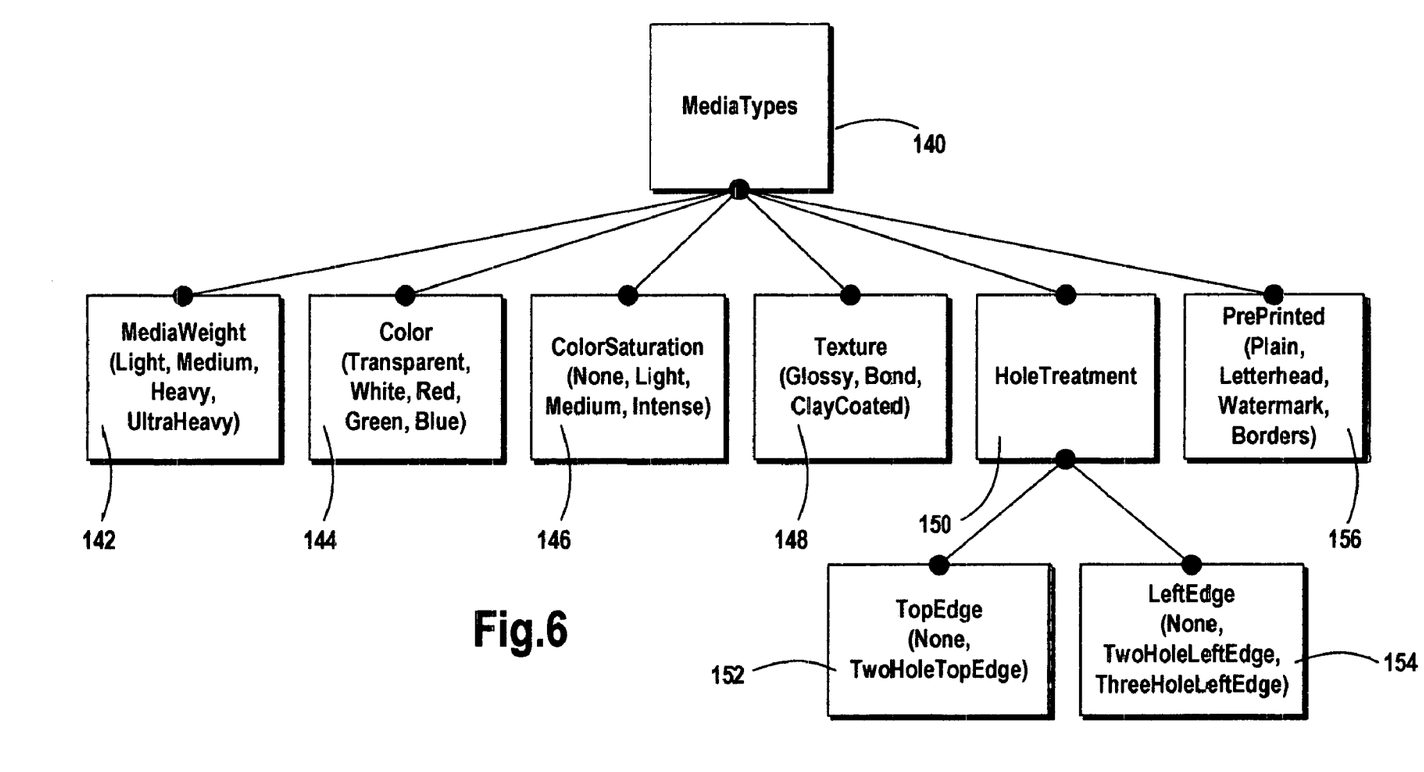
FIG. 6 is a depiction of a print feature hierarchical tree structure used to explain the recursive nature of a print scoring process of this invention.

Suppose that a generalized capabilities data structure for a class of electronic printers includes the tree of generalized properties subordinate to the feature "MediaType" 140 which is illustrated in FIG. 6. According to this scheme, "MediaType" 140 has the following properties:

MediaWeight (142): Light (20 lb.), Medium (24 lb.), Heavy (28 lb.), Ultra Heavy (32 lb.)
    Color (144): Transparent, White, Red, Green, Blue
    ColorSaturation (146): None, Light, Medium, Intense
    Texture (148): Glossy, Bond, ClayCoated
    HoleTreatment (150):
        LeftEdge (152): None, TwoHoleLeftEdge, ThreeHoleLeftEdge
        TopEdge (154): None, TwoHoleTopEdge
    PrePrinted (156): Plain, Letterhead, Watermark, Borders Consider the following job ticket:
    MediaWeight: Medium
        (Weight=100)
        (VarianceFactor=5)
    Color: White
        (Weight=100)
    ColorSaturation: None
        (Weight=100)
    Texture: Bond
        (Weight=100)
    HoleTreatment:
        (Weight=200)
        LeftEdge: None
            (Weight=1000)
        TopEdge: None
            (Weight=500)
    PrePrinted: Plain
        (Weight=100)

Let the electronic printer support the following three MediaType 140 options:
    MediaWeight: Heavy
    Color: Transparent
    ColorSaturation: None
    Texture: Glossy
    HoleTreatment:

LeftEdge: ThreeHoleLeftEdge
TopEdge: None
PrePrinted: Plain
MediaWeight: Medium
Color: Blue
ColorSaturation: Light
Texture: ClayCoated
HoleTreatment:
   LeftEdge: None
   TopEdge: None
PrePrinted: Borders
MediaWeight: Light
Color: White
ColorSaturation: None
Texture: Bond
HoleTreatment:
   LeftEdge: None
   TopEdge: None
PrePrinted: Plain The optimal MediaType 140 option will be determined by comparison of the job ticket with the three device capabilities options. More specifically, the scoring factor at each level of the hierarchy of features and properties will be determined by the scoring algorithm:

$$\frac{\sum_i SF_i * W_i}{\sum_i W_i},$$

where "$SF_i$" is the scoring factor associated with an option or property having subproperties and "$W_i$" is a weighting factor. The same scoring algorithm is repeated on each level of the trees of scored properties.

It is noted that the only property among those defined in the generalized capabilities having subproperties is the "HoleTreatment" property 150. Comparing the desired properties with the scored properties corresponding to the first device capabilities option, it is noted that the desired property subordinate to the "LeftEdge" property 152 is "None," while the corresponding property in the tree of scored properties subordinate to the "LeftEdge" property 152 is "ThreeHolesLeftEdge." Thus, the scoring factor for the "LeftEdge" 152 property is zero. On the other hand, both the desired subproperty and the corresponding subproperty under the "TopEdge" property 154 are "None." It follows that the scoring factor for the "Top Edge" property 154 is 1. The scoring factor for the "HoleTreatment" property 150 is obtained by multiplying the scoring factors by the numerical weights assigned to the "LeftEdge" 152 and "TopEdge" 152 properties, respectively; adding the scoring factors for the "LeftEdge" and "TopEdge" properties 152, 154 to obtain a weighted sum (1000*0+500*1=500); adding the numerical weights of the "LeftEdge" and "TopEdge" properties 152, 154 to obtain a normalizing factor (1000+500=1500); and dividing the weighted sum by the normalizing factor to obtain the scoring factor (500/1500=0.33).

Continuing with the comparison, it is noted that the job ticket specifies a variance factor of "5" for the MediaWeight property 142 based on the weights of the papers specified in the generalized capabilities data structure. The desired subproperty for the "MediaWeight" property 142 is "Medium" (24 lb.). The corresponding subproperty in the tree of scored properties is "Heavy" (28 lb.). Thus, the scoring factor associated with the MediaWeight property 142 is $k_i/[k_i+\Delta]$ =5/[5+|24−28|]=0.56. It is noted that the scoring factor associated with the MediaWeight property 142 is non-zero even though there is a variation between the desired property and the corresponding property of the tree of scored properties.

Continuing on the same manner, one obtains the following scoring factors:
MediaWeight: 0.56
Color: 100
ColorSaturation: 100
Texture: 0
HoleTreatment: 0.33
PrePrinted: 100

Multiplying these scoring factors by the respective weights and adding, one obtains a final (non-normalized) score of 100*0.56+100*1+100*1+100*0+200*0.33+100*1= 422.

Similarly, comparison of the desired options with the second set of device capabilities options yields an operation score (non-normalized) of 300. Comparison of the desired options with the third set of device capabilities options yields a final score of 656. Since the comparison of the desired options with the third set of device capabilities options yields the largest operation score, the MediaType 140 represented by the third set of device capabilities options is the optimal MediaType 140 even though it does not identically match the desired options. Note, if normalization has been done the same "winning" option would have been determined but with a different score between 0 and 1.

Thus, where the job ticket presented with a print job sent to an electronic printer does not match identically an option within the capabilities of the printer, the exemplary system and method provide for selection of the optimal operation within the printer's capabilities which most closely matches the user's intent. The comparison between the job ticket and the options within the capabilities of the printer is facilitated by the generalized capabilities data structure (4 in FIG. 1) which provides a common framework and vocabulary for the comparison.

Example 2

The interoperability of the exemplary system and method will be illustrated by the following example. Assume that an institution has created standard definitions of MediaSize (e.g., paper size) properties. Let the standard MediaSize property contain the following options (expressed in XML code):

<PROPERTY>
  <Name>
  <MediaSizeX>
  <MediaSizeY>
<PROPERTY>

Now assume that there exist other clients that use another system of referring to media sizes. This system describes media sizes using a different naming convention, which will be referred to as the "A Name" system. Let there be another group of clients that use a second naming convention, which will be referred to as the "B Name" system.

The exemplary system and method allow devices to accommodate these client's naming conventions by simply adding the "A Name" system and the "B Name" system as additional subproperties for the MediaSize property:

<PROPERTY>
  <Name>
  <MediaSizeX>

```
<MediaSizeY>
<AName>
<BName>
</PROPERTY>
```

Thus, if a client requests a media size by referencing only the "A Name," he automatically will get the correct media size.

```
<PROPERTY>
<AName>
</PROPERTY>
```

In order to ensure that the "A Name" produces a good match even on devices that do not recognize the "A Name" property, the weighting of the "A Name" property can be increased to ensure that the property is given precedence during the scoring process:

```
<PROPERTY>
<Name>
<MediaSizeX>
<MediaSizeY>
<AName Weight=100>
</PROPERTY>
```

While the invention has been described with a degree of particularity, it is the intent that the invention include all modifications and alterations falling within the spirit or scope of the appended claims. Thus it is appreciated that the particular method used for comparing an intended operation specified in a job ticket data structure 6 with the plurality of operations which the device 2 is capable of performing to obtain operation scores for the plurality of operations is not critical to the present invention.

What is claimed is:

1. A method for controlling a device capable of performing an operation in response to a job ticket, the operation being fulfilled by device options, the job ticket including desired properties, the method comprising:
   a) comparing the desired properties with properties included in each option of the set of device capabilities options to determine sets of scoring factors, each set of scoring factors being associated with an option of the device capabilities options; and
   b) performing the operation using an optimal option of the set of device capabilities options having a preferred set of scoring factors.

2. The method of claim 1 wherein the device is a printer.

3. The method of claim 1 wherein:
the comparing includes assigning one value to a scoring factor associated with a scored property of an option when said scored property is substantially identical to a corresponding property of the desired properties; and
the comparing includes assigning zero to the scoring factor when the scored property is not substantially identical to the corresponding property of the desired properties.

4. The method of claim 1 wherein:
desired properties are assigned ordinal numbers "i" and numerical weights $W_i$;
corresponding properties of said options are assigned the same ordinal numbers "i;"
the set of scoring factors associated with the one tree of scored properties includes scoring factors $SF_i$ associated with the corresponding properties; and
additionally comprising accumulating a weighted sum $$\sum_i SF_i * W_i$$

to determine the optimal option.

5. The method of claim 1 wherein:
a desired property is assigned a numerical weight $W_i$;
the comparing includes assigning the numerical weight $W_i$ to a scoring factor of one of the sets of scoring factors associated with a corresponding property when the corresponding property is substantially identical to the desired property; and
the comparing includes assigning zero to the scoring factor when the corresponding property is not substantially identical to the desired property.

6. The method of claim 1 wherein:
a desired property of the tree of desired properties is assigned a non-negative, monotone decreasing function $V_i$ such that $V_i[0]=1$; and
the comparing includes assigning $V_i[m_i]$ to a scoring factor associated with a corresponding property, where "$m_i$" is a measure between the corresponding property and the desired property.

7. The method of claim 1 wherein:
desired properties of the tree of desired properties are assigned ordinal numbers "i," numerical weights $W_i$, and non-negative, monotone decreasing functions $V_i$ such that $V_i[0]=1$;
corresponding properties are assigned the same ordinal numbers "i;"
for each corresponding property "i" of the corresponding properties, the comparing includes assigning $V_i[m_i]$ to a scoring factor "$SF_i$" of the sets of scoring factors associated with that corresponding property "i," where "$m_i$" is a measure between the desired property "i" and the corresponding property "i;" and
additionally accumulating scoring factors to obtain a weighted sum $$\sum_i SF_i * W_i.$$

8. The method of claim 1 wherein:
a desired property is assigned a numerical weight $W_i$ and a non-negative, monotone decreasing function $V_i$ such that $V_i[0]=1$; and
the comparing includes assigning the product $W_i * V_i[m_i]$ to a scoring factor associated with a corresponding property, where "$m_i$" is a measure between the corresponding property and the desired property.

9. The method of claim 1 wherein:
a desired property of the tree of desired properties is assigned a variance factor $k_i$; and
the comparing includes assigning $k_i/[k_i+\Delta_i]$ to a scoring factor associated with a corresponding property, where "$\Delta_i$" is an absolute value of the difference between the corresponding property and the desired property.

10. The method of claim 1 wherein:
desired properties of the tree of desired properties are assigned ordinal numbers "i," numerical weights $W_i$, and variance factors $k_i$;
for each corresponding property "i" of the corresponding properties, the comparing includes assigning $k_i/[k_i+\Delta_i]$ to a scoring factor "$SF_i$" of the sets of scoring factors associated with that corresponding property "i," where "$\Delta_i$" is an absolute value of the difference between the desired property "i" and the corresponding property "i;" and additionally comprising accumulating a weighted sum $$\sum_i SF_i * W_i.$$

11. The method of claim 1 wherein:

a desired property of the tree of desired properties is assigned a numerical weight $W_i$ and a variance factor $k_i$; and the comparing includes assigning the product $W_i*k_i/[k_i+\Delta_i]$ to a scoring factor associated with a corresponding property, where "$\Delta_i$" is the absolute value of the difference between the corresponding property and the desired property.

12. The method of claim 1 wherein the accumulating includes adding scoring factors of each set of scoring factors.

13. The method of claim 1 wherein:

a tree of desired properties is constructed to include a desired property and desired subproperties, the desired property having a vertex within the tree of desired properties and the desired subproperties having subordinate vertices within the tree of desired properties;

the comparing includes comparing the desired subproperties with corresponding subproperties in corresponding vertices in trees of scored properties corresponding to different options to obtain sets of subordinate level scoring factors associated with the corresponding subproperties;

additionally accumulating the sets of subordinate level scoring factors to obtain parent scoring factors of the sets of scoring factors associated with corresponding properties in vertices of the trees of scored properties corresponding to the vertex of the desired property in the tree of desired properties; and the accumulating further includes accumulating the parent scoring factors with other scoring factors in the sets of scoring factors.

14. The method of claim 1 wherein:

a tree of desired properties is constructed to include a desired property and desired subproperties, the desired property having a vertex within the tree of desired properties and the desired subproperties having subordinate vertices within the tree of desired properties, each desired subproperty being assigned an ordinal number "i" and a numerical weight $W_i$;

corresponding subproperties in corresponding vertices within a tree of scored properties of the trees of scored properties are assigned the same ordinal numbers "i;"

for each corresponding subproperty "i" of the corresponding subproperties, the comparing includes comparing the corresponding subproperty "i" with a desired subproperty "i" of the desired subproperties to obtain a subordinate level scoringfactor $SF_i$;

determining a weighted sum:

$$\frac{\sum_i SF_i * W_i}{\sum_i W_i}$$

to a parent scoring factor of the one set of scoring factors associated with the desired property; and the determining further includes accumulating the parent scoring factor with other scoring factors.

15. The method of claim 1 wherein the optimal option is not a constrained option.

16. The method of claim 1 wherein the job ticket is defined by a tree of desired properties and each option of the device capabilities options is defined by a tree of scored properties that are compared with the desired properties.

17. A method for controlling an electronic printer capable of performing a print operation in response to a job ticket, the print operation being fulfilled by device capabilities options, the job ticket including a tree of desired properties and each option of the device capabilities options including a tree of scored properties, the method comprising:

a) comparing the tree of desired properties with the tree of scored properties included in each option of the set of device capabilities options to obtain sets of scoring factors, each set of scoring factors being associated with an option of the device capabilities options and each scoring factor of each set of scoring factors being associated with a property of one of the trees of scored properties;

b) performing linear combinations of each set of scoring factors to obtain a plurality of final scores, each final score of the plurality of final scores being associated with one option of the device capabilities options; and c) performing the print operation using an optimal option of the plurality of device capabilities options associated with a preferred score of the plurality of final scores.

18. A computer readable medium containing instructions for controlling a device capable of performing an operation in response to a job ticket, the operation being fulfilled by device options, the job ticket including desired properties, comprising:

a) comparing the desired properties with properties included in each option of the set of device capabilities options to determine sets of scoring factors, each set of scoring factors being associated with an option of the device capabilities options; and b) performing the operation using an optimal option of the set of device capabilities options having a preferred set of scoring factors.

19. The computer readable medium of claim 18 wherein the device is a printer.

20. The computer readable medium of claim 18 wherein:

the comparing includes assigning one value to a scoring factor associated with a scored property of an option when said scored property is substantially identical to a corresponding property of the desired properties; and the comparing includes assigning zero to the scoring factor when the scored property is not substantially identical to the corresponding property of the desired properties.

21. The computer readable medium of claim 18 wherein:

desired properties are assigned ordinal numbers "i" and numerical weights $W_i$;

corresponding properties of said options are assigned the same ordinal numbers "i;"
the set of scoring factors associated with the one tree of scored properties includes scoring factors $SF_i$ associated with the corresponding properties; and
additionally comprising accumulating a weighted sum $$\sum_i SF_i * W_i$$

to determine the optimal option.

22. The computer readable medium of claim 18 wherein:
a desired property is assigned a numerical weight $W_i$;
the comparing includes assigning the numerical weight $W_i$ to a scoring factor of one of the sets of scoring factors associated with a corresponding property when the corresponding property is substantially identical to the desired property; and
the comparing includes assigning zero to the scoring factor when the corresponding property is not substantially identical to the desired property.

23. The computer readable medium of claim 18 wherein:
a desired property of the tree of desired properties is assigned a non-negative, monotone decreasing function $V_i$ such that $V_i[0]=1$; and
the comparing includes assigning $V_i[m_i]$ to a scoring factor associated with a corresponding property, where "$m_i$" is a measure between the corresponding property and the desired property.

24. The computer readable medium of claim 18 wherein:
desired properties of the tree of desired properties are assigned ordinal numbers "i," numerical weights $W_i$, and non-negative, monotone decreasing functions $V_i$ such that $V_i[0]=1$;
corresponding properties are assigned the same ordinal numbers "i;"
for each corresponding property "i" of the corresponding properties, the comparing includes assigning $V_i[m_i]$ to a scoring factor "$SF_i$" of the sets of scoring factors associated with that corresponding property "i," where "$m_i$" is a measure between the desired property "i" and the corresponding property "i;" and
additionally accumulating scoring factors to obtain a weighted sum $$\sum_i SF_i * W_i.$$

25. The computer readable medium of claim 18 wherein:
a desired property is assigned a numerical weight $W_i$ and a non-negative, monotone decreasing function $V_i$ such that $V_i[0]=1$; and
the comparing includes assigning the product $W_i * V_i[m_i]$ to a scoring factor associated with a corresponding property, where "$m_i$" is a measure between the corresponding property and the desired property.

26. The computer readable medium of claim 18 wherein:
a desired property of the tree of desired properties is assigned a variance factor $k_i$; and
the comparing includes assigning $k_i/[k_i+\Delta_i]$ to a scoring factor associated with a corresponding property, where "$\Delta_i$" is an absolute value of the difference between the corresponding property and the desired property.

27. The computer readable medium of claim 18 wherein:
desired properties of the tree of desired properties are assigned ordinal numbers "i," numerical weights $W_i$, and variance factors $k_i$;
for each corresponding property "i" of the corresponding properties, the comparing includes assigning $k_i/[k_i+\Delta_i]$ to a scoring factor "$SF_i$" of the sets of scoring factors associated with that corresponding property "i," where "$\Delta_i$" is an absolute value of the difference between the desired property "i" and the corresponding property "i;" and
additionally comprising accumulating a weighted sum $$\sum_i SF_i * W_i.$$

28. The computer readable medium of claim 18 wherein:
a desired property of the tree of desired properties is assigned a numerical weight $W_i$ and a variance factor $k_i$; and
the comparing includes assigning the product $W_i * k_i/[k_i+\Delta_i]$ to a scoring factor associated with a corresponding property, where "$\Delta_i$" is the absolute value of the difference between the corresponding property and the desired property.

29. The computer readable medium of claim 18 wherein the accumulating includes adding scoring factors of each set of scoring factors.

30. The computer readable medium of claim 18 wherein:
a tree of desired properties is constructed to include a desired property and desired subproperties, the desired property having a vertex within the tree of desired properties and the desired subproperties having subordinate vertices within the tree of desired properties;
the comparing includes comparing the desired subproperties with corresponding subproperties in corresponding vertices in trees of scored properties corresponding to different options to obtain sets of subordinate level scoring factors associated with the corresponding subproperties;
additionally accumulating sets of subordinate level scoring factors to obtain parent scoring factors of the sets of scoring factors associated with corresponding properties in vertices of the trees of scored properties corresponding to the vertex of the desired property in the tree of desired properties; and
the accumulating further includes accumulating the parent scoring factors with other scoring factors in the sets of scoring factors.

31. The computer readable medium of claim 18 wherein:
a tree of desired properties is constructed to include a desired property and desired subproperties, the desired property having a vertex within the tree of desired properties and the desired subproperties having subordinate vertices within the tree of desired properties, each desired subproperty being assigned an ordinal number "i" and a numerical weight $W_i$;
corresponding subproperties in corresponding vertices within a tree of scored properties of the trees of scored properties are assigned the same ordinal numbers "i;"
for each corresponding subproperty "i" of the corresponding subproperties, the comparing includes comparing the corresponding subproperty "i" with a desired subproperty "i" of the desired subproperties to obtain a subordinate level scoringfactor $SF_i$;

determining a weighted sum:

$$\frac{\sum_i SF_i * W_i}{\sum_i W_i}$$

to a parent scoring factor of the one set of scoring factors associated with the desired property; and the determining further includes accumulating the parent scoring factor with other scoring factors.

32. The computer readable medium of claim 18 wherein the optimal option is not a constrained option.

33. The computer readable medium of claim 18 wherein the job ticket is defined by a tree of desired properties and each option of the device capabilities options is defined by a tree of scored properties that are compared with the desired properties. a) comparing the tree of desired properties with the tree of scored properties included in each option of the set of device capabilities options to obtain sets of scoring factors, each set of scoring factors being associated with an option of the device capabilities options and each scoring factor of each set of scoring factors being associated with a property of a tree of the trees of scored properties;

b) accumulating each set of scoring factors to obtain a plurality of final scores, each final score of the plurality of final scores being associated with one option of the device capabilities options; and c) performing the operation using an optimal option of the device capabilities options associated with a preferred score of the plurality of final scores.

34. A schema for determining device capabilities comprising:

a first data structure that defines the job requirements for a device task including desired properties and subproperties; and a second data structure that defines a device capabilities option that is defined by a plurality of scored properties and subproperties nodes that are compared with the desired properties and subproperties of the job requirements data structure by traversing property and subproperty nodes of said second data structure and determining a score for each of said nodes and thereby allowing an option score to be calculated.

35. The schema of claim 34 wherein the second data structure is a tree structure with subproperty nodes beneath parent property nodes of said tree structure.

36. A system for printing comprising a computer and a printer coupled by a communications path for transmitting data from the computer to said printer comprising a computing device associated with either the computer or the printer for:

a) comparing the desired properties of a print job ticket with properties included in each option of the set of print options to determine sets of scoring factors, each set of scoring factors being associated with a print option of a set of print options; and b) performing printing using an optimal print option of the set of print options having a preferred scoring factor.

37. The system of claim 36 wherein the print job ticket is in the form of an XML document.

38. The system of claim 37 wherein the printer has constraints which are used by the computing device for limiting the optimal print option for a given print job ticket.

* * * * *

UNITED STATES PATENT AND TRADEMARK OFFICE
CERTIFICATE OF CORRECTION

PATENT NO. : 6,975,820 B2
APPLICATION NO. : 10/779515
DATED : December 13, 2005
INVENTOR(S) : Peter W. Wong It is certified that error appears in the above-identified patent and that said Letters Patent is hereby corrected as shown below:

On Sheet 3 of 7, Fig. 4A, Box above 62 (Fig.4A), line 3, after "DEVICE" delete "IN THE DEVICE". (second occurrence)

In column 1, line 35, delete "WIDOWS" and insert -- WINDOWS --, therefor.

In column 6, line 4, delete "proprety" and insert -- property --, therefor.

In column 6, line 23, delete "ubset" and insert -- subset --, therefor.

In column 6, line 30, after "m(a, c)." delete ").". (second occurrence)

In column 6, line 50, after ""$W_i$"" insert -- " --.

In column 7, line 15, delete "sum" before "  ". (repeated occurrence)

In column 7, line(s) 50-51, delete "hightest" and insert -- highest --, therefor.

In column 10, line 54, delete "<PROPERTY>" and insert -- </PROPERTY> --, therefor.

Signed and Sealed this

Fifteenth Day of September, 2009

David J. Kappos
*Director of the United States Patent and Trademark Office*